United States Patent
Yokoo et al.

(10) Patent No.: US 8,792,935 B2
(45) Date of Patent: Jul. 29, 2014

(54) MOBILE COMMUNICATION TERMINAL HAVING ANTENNA COMMONLY USED BY FIRST AND SECOND CIRCUITS, WITH IMPEDANCE MATCHED TO FIRST OR SECOND FREQUENCY BAND

(75) Inventors: Kaoru Yokoo, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1082 days.

(21) Appl. No.: 11/490,309

(22) Filed: Jul. 21, 2006

(65) Prior Publication Data

US 2007/0216519 A1 Sep. 20, 2007

(30) Foreign Application Priority Data

Mar. 17, 2006 (JP) .................................. 2006-075006

(51) Int. Cl.
*H04M 1/00* (2006.01)
*H04B 1/46* (2006.01)
*H04W 4/00* (2009.01)
*H04H 20/67* (2008.01)

(52) U.S. Cl.
USPC ....... 455/552.1; 455/553.1; 455/82; 370/329; 370/339

(58) Field of Classification Search
USPC .......... 455/89, 552.1, 41.1, 7, 41.2, 121–123, 455/82–83, 562.1, 575.1, 575.5, 575.7, 107, 455/90.3, 575, 553.1; 340/10.1, 10.2, 340/572.1, 572; 343/702, 842, 860, 870, 343/872, 822, 852; 370/339, 329
See application file for complete search history.

(56) References Cited

U.S. PATENT DOCUMENTS

| | | | | |
|---|---|---|---|---|
| 4,521,913 A | * | 6/1985 | Huber et al. | 455/121 |
| 5,652,599 A | * | 7/1997 | Pitta et al. | 343/858 |
| 7,539,527 B2 | * | 5/2009 | Jang et al. | 455/575.3 |
| 7,548,208 B2 | * | 6/2009 | Dou et al. | 343/702 |
| 8,345,652 B2 | * | 1/2013 | Banerjea et al. | 370/338 |
| 2003/0006901 A1 | * | 1/2003 | Kim et al. | 340/572.5 |
| 2004/0048577 A1 | * | 3/2004 | Godfrey et al. | 455/67.11 |
| 2004/0075491 A1 | * | 4/2004 | Kushitani et al. | 330/51 |

(Continued)

FOREIGN PATENT DOCUMENTS

DE 29703761 U1 7/1997
JP 63180224 A 7/1988

(Continued)

OTHER PUBLICATIONS

Communication dated Jul. 28, 2008 regarding an Extended European Search Report from Corresponding European Application No. 06253814.5.

(Continued)

*Primary Examiner* — Nizar Sivji
(74) *Attorney, Agent, or Firm* — Smith, Gambrell & Russell, LLP

(57) ABSTRACT

A mobile communication terminal used in a mobile communication system providing mobile communicating service in a first frequency band is disclosed. The mobile communication terminal comprises a first signal processing circuit for processing signals for the mobile communication service; a second signal processing circuit for processing signals for radio tag communicating in a second frequency band; and an antenna commonly used by the first and second signal processing circuits. The impedance of the antenna is matched with the first signal processing circuit in the first frequency band and matched with the second signal processing circuit in the second frequency band.

13 Claims, 12 Drawing Sheets

(56) References Cited

U.S. PATENT DOCUMENTS

| | | | |
|---|---|---|---|
| 2005/0052283 A1* | 3/2005 | Collins et al. | 340/572.7 |
| 2005/0092845 A1* | 5/2005 | Forster | 235/492 |
| 2005/0107042 A1* | 5/2005 | De Graauw | 455/78 |
| 2006/0132360 A1* | 6/2006 | Caimi et al. | 343/700 MS |
| 2006/0142075 A1* | 6/2006 | Jang et al. | 455/575.7 |
| 2007/0141997 A1* | 6/2007 | Wulff et al. | 455/78 |
| 2007/0225033 A1* | 9/2007 | Yoon et al. | 455/552.1 |

FOREIGN PATENT DOCUMENTS

| | | |
|---|---|---|
| JP | 9270619 A | 10/1997 |
| JP | 2001-307032 | 11/2001 |
| JP | 2002084345 A | 3/2002 |
| JP | 2002-353852 | 12/2002 |
| JP | 2002353852 A * | 12/2002 |
| JP | 2003-037861 | 2/2003 |
| WO | WO 97/10621 A | 3/1997 |
| WO | WO 03/077436 A | 9/2003 |
| WO | 2005088833 A1 | 9/2005 |
| WO | WO 2006/056388 | 6/2006 |

OTHER PUBLICATIONS

Japanese Office Action dated Feb. 16, 2010 received in Japanese Patent Application No. 2006-075006.

* cited by examiner $$f = \frac{1}{2\pi\sqrt{LC}}$$

$$R1 = R2$$

180mm

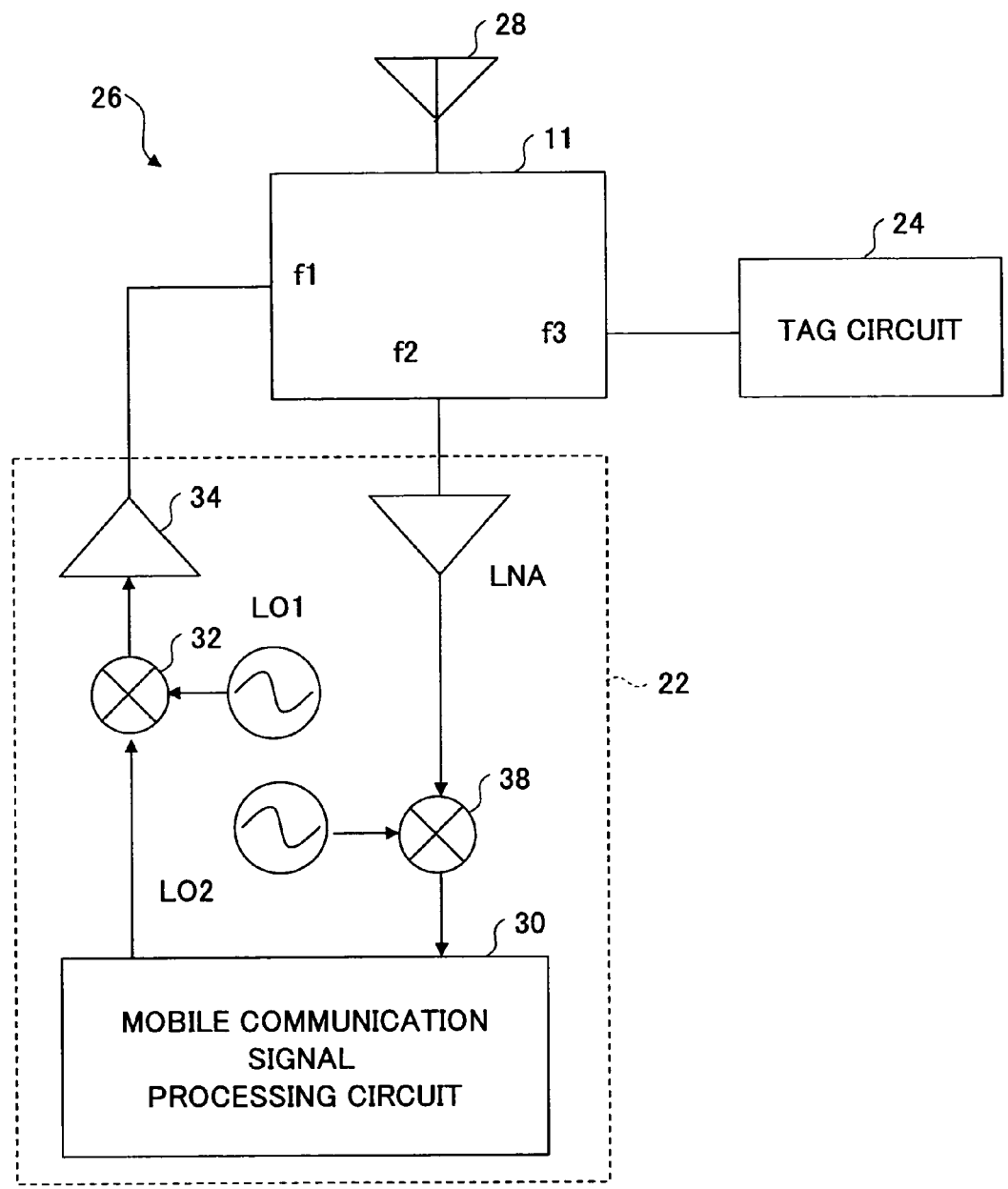

MOBILE COMMUNICATION TERMINAL HAVING ANTENNA COMMONLY USED BY FIRST AND SECOND CIRCUITS, WITH IMPEDANCE MATCHED TO FIRST OR SECOND FREQUENCY BAND

This application claims priority to Japanese Patent Application No. 2006-075006, filed Mar 17, 2006.

BACKGROUND OF THE INVENTION

1. Field of the Invention

The present invention generally relates to mobile communication fields, and especially relates to a mobile communication terminal including a built-in radio tag.

2. Description of the Related Art

Recently, systems utilizing a radio tag have been attracting attention. Such a system includes a radio tag and a reader/writer device. The reader/writer device can read information from the radio tag and write information into the radio tag. The reader/writer device is referred to as an "interrogator". The radio tag is referred to as an "RF tag", "RFID", "RFID tag", "IC tag", "electronic tag" and so on.

Data like identification (ID) or product number may be read and written via such a radio tag to manage and control product quality. Alternatively, information representing some values like tickets or points may be read, and therefore a variety of uses like electronic tickets, fare tickets or electronic money, not only product management, are expected. If such a radio tag is really built in a mobile communication terminal such as a cellular phone, the radio tag will become drastically more convenient, but the mobile communication terminal must have enough space to accommodate the radio tag.

However, such a radio tag requires a comparatively large space, and especially the antenna of the radio tag will occupy a large part of the volume of the mobile communication terminal. Japanese Patent Laid-Open No. 2003-37861 (Patent Document #1) discloses a technique where a contact-less IC card with a coiled antenna is mounted on a back surface of a battery of a mobile communication terminal to miniaturize the mobile communication terminal having the IC card.

Even if such a radio tag can be physically built in a mobile communication terminal, a further problem will remain. The frequency of the existing radio tag is 13.5 MHz, which is lower than the frequency of the mobile communication, and therefore significant limitations are placed on directions or distances where the radio tag can communicate. As for the mobile communication terminal as described in Patent Document #1, it is required to hold the IC card mounting surface right on the reader/writer device. If such optimum position is not obtained, radio tag communication becomes difficult. In the future, radio tags may utilize the UHF band frequencies (such as 953 MHz) so that communications directions and distances may be improved to some extent and therefore the above limitation on the communications directions and distances can be improved to some extent. However, the above problem cannot be completely solved.

On the other hand, as described in Patent Documents #2 and #3, one antenna is shared by a reader/writer device (communicating with a radio tag) and a mobile communication terminal (communicating a host computer) to reduce the size of the mobile communication terminal. In this kind of technique, it is premised that the impedance of the mobile communication circuit and the impedance of the reader/writer device circuit are the same.

FIG. 1 shows a Smith chart for illustrating impedance characteristics of a circuit or an antenna. Circles passing through a point P and including the whole line PR or a part thereof as diameters represent impedance locus (impedance characteristics) whose resistance components (real components) are the same. Arcs passing through and perpendicularly crossing all the above circles represent impedance locus (impedance characteristics) whose resistance components (complex components) are the same. Generally, a processing circuit in a mobile communication terminal has a characteristic impedance (complex component of zero and resistance component value of 50 Ω) of 50 Ω in the 800 MHz operating frequency band, and the impedance is indicated by a point Q. In Patent Documents #2 and #3, both the impedance Z1 of the mobile communication terminal and the impedance Z2 of the reader/writer device are placed (indicated by A) near the characteristic impedance, or an adjusting circuit is prepared in order to make those impedances Z1, Z2 be near the characteristic impedance Q.

On the other hand, the impedance of a radio tag processing circuit is much different from the characteristic impedance, and is indicated by point S. In this, both the impedance of the processing circuit in the mobile communication terminal and the impedance of the radio tag processing circuit are completely different from each other. Although an adjusting circuit may be introduced to make these impedances match each other, the introduction of such an adjusting circuit is against the requirement for miniaturizing the mobile communication terminal. Therefore, it is difficult to miniaturize a device having both functions as a mobile communication terminal and a radio tag using technologies disclosed in Patent Documents #2 and #3.

As explained above, when containing a radio tag in a mobile communication terminal, an additional antenna for the radio tag is needed in addition to an existing antenna for the mobile communication terminal. Mobile communication terminals desired to be miniaturized have no space to mount the additional antenna, which is a problem. Further, in general, housings of mobile communication terminals use many metallic parts such as a substrate, shield plates and so on, and therefore such mobile cellular phones with a built-in IC card as described in Patent Document #1 can only use their contact-less IC mounting surface for communicating with an external card reader/writer, which is inconvenient to users.

[Patent Document #1]
Japanese Patent Laid-open No. 2003-37861
[Patent Document #2]
Japanese Patent Laid-open No. 2001-307032
[Patent Document #3]

SUMMARY OF THE INVENTION

The present invention provides a mobile communication terminal having a built-in radio tag, in which limitations on directions for communication of the radio tag are relaxed with a simple structure.

Features of Embodiments of the present invention are set forth in the description that follows, and in part will become apparent from the description and the accompanying drawings, or may be learned by practice of the invention according to the teachings provided in the description. Problem solutions provided by embodiments of the present invention will be realized and attained by a mobile communication terminal particularly pointed out in the specification in such full, clear, concise, and exact terms as to enable a person having ordinary skill in the art to practice the invention.

Means for Solving the Problem

An aspect of the present invention provides a mobile communication terminal used in a mobile communication system providing mobile communicating service in a first frequency band, comprising: a first signal processing circuit for processing signals for the mobile communication service; a second signal processing circuit for processing signals for radio tag communicating in a second frequency band; and an antenna commonly used by the first and second signal processing circuits; wherein an impedance of the antenna is matched with the first signal processing circuit in the first frequency band and matched with the second signal processing circuit in the second frequency band.

In the mobile communication terminal, the impedance of the antenna may be mismatched with the second signal processing circuit in the first frequency band and mismatched with the first signal processing circuit in the second frequency band.

In the mobile communication terminal, the antenna may comprise a dipole antenna.

In the mobile communication terminal, the antenna may have meandering lines.

In the mobile communication terminal, the second frequency band may include at least part of the UHF band.

In the mobile communication terminal, the first and second signal processing circuits may be connected to the antenna in parallel.

The mobile communication terminal may further comprise a switch for selectively connecting the antenna to the second signal processing circuit.

The mobile communication terminal may further comprise a switch for selectively connecting the antenna to one of the first and second signal processing circuits.

In the mobile communication terminal, the switch selectively connects the antenna to one of a transmitting portion of the first signal processing circuit, a receiving portion of the first signal processing circuit and the second signal processing circuit.

The mobile communication terminal may further comprise a frequency discriminator between the first and second signal processing circuits.

In the mobile communication terminal, the frequency discriminator discriminates between frequencies used in the transmitting portion of the first signal processing circuit, the receiving portion of the first signal processing circuit and the second signal processing circuit.

The mobile communication terminal is a mobile phone terminal.

EFFECT of the INVENTION

According to the present invention, a mobile communication terminal having a built-in radio tag is provided, in which limitations on directions for communication of the radio tag are relaxed with a simple structure.

BRIEF DESCRIPTION OF THE DRAWINGS

FIG. 12 shows a mobile communication terminal with another frequency discriminator.

DESCRIPTION OF THE PREFERRED EMBODIMENTS

In the following, embodiments of the present invention are described with reference to the accompanying drawings.

<Embodiment 1>

Figure 2:
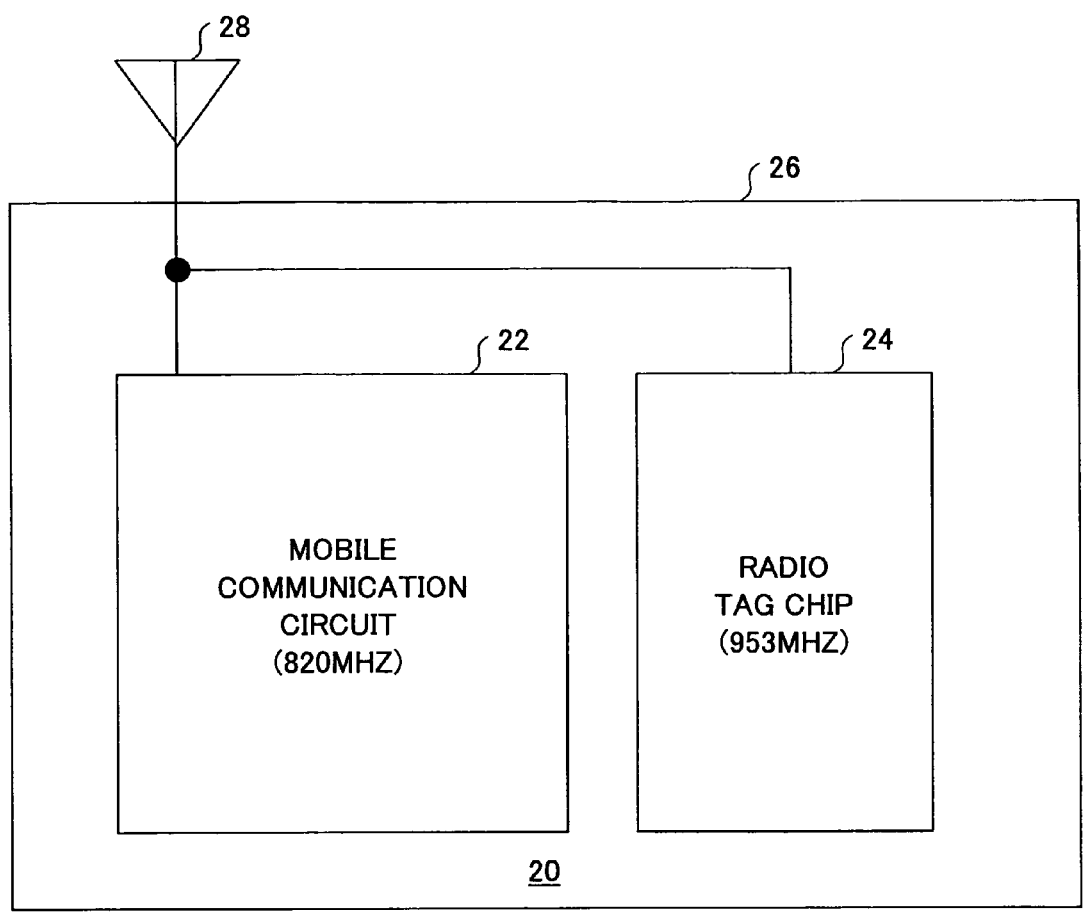
FIG. 2 shows a mobile communication terminal according to a first embodiment of the present invention.

FIG. 2 shows a mobile communication terminal according to an embodiment of the present invention. The mobile communication terminal has a housing 26, and a mobile communication circuit 22 and a radio tag chip 24 within the housing 26. The mobile communication circuit 22 and the radio tag chip 24 are connected to a shared antenna 28. The mobile communication circuit 22 processes signals (for example signals of 802.6 MHz band) relating to a mobile communication service. The radio tag chip 24 processes signals (for example signals of 953 MHz band) transmitted and received between the mobile communication terminal 20 and a tag reader/writer (not shown). It is assumed that this embodiment employs a radio tag operating in the UHF band. However, the present invention can be applied to other frequency bands. The impedance of the shared antenna 28 is matched with the mobile communication circuit 22 for the mobile communication service frequency band, and matched with the radio tag chip 24 for the radio tag frequency band. The material, shape and size of the shared antenna are properly determined so as to have such impedance characteristics.

Figure 3:
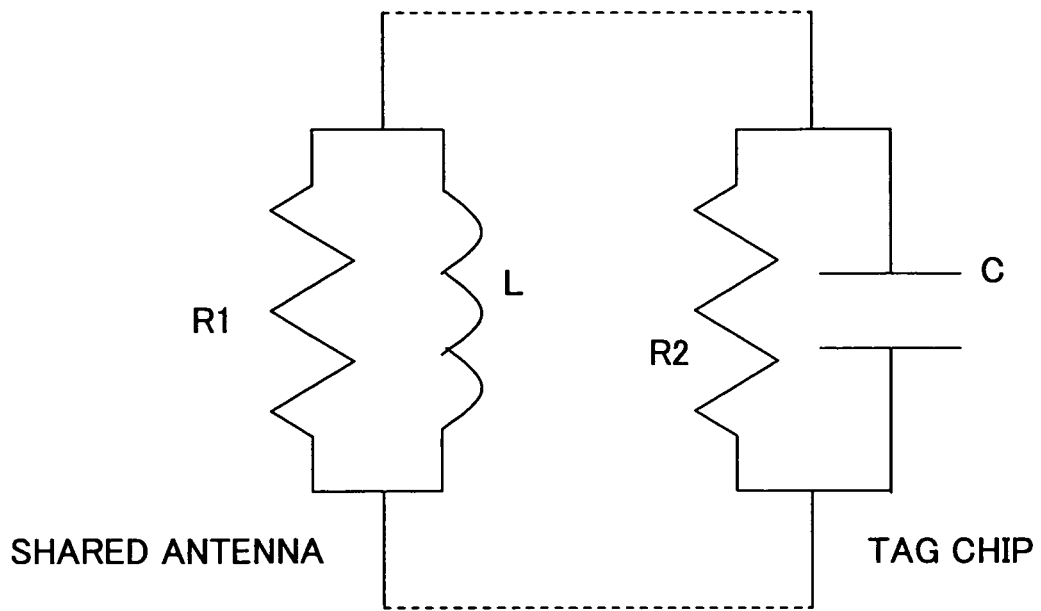
FIG. 3 illustrates a matching condition where the shared antenna is matched with the radio tag 24.

FIG. 3 shows the condition where the shared antenna 28 is matched with the radio tag 24 for a certain frequency. The shared antenna 28 is represented by a parallel circuit having a resistance R1 and an inductance L. The radio tag chip 24 is represented by a parallel circuit having a resistance R2 and a capacitance C.

When their operation frequency is f, the following equations are required to hold in order to match their circuits with each other.

$$f = (2\pi \times (LC)^{1/2})^{-1};\text{ and}$$

$$R1 = R2$$

Figure 1:
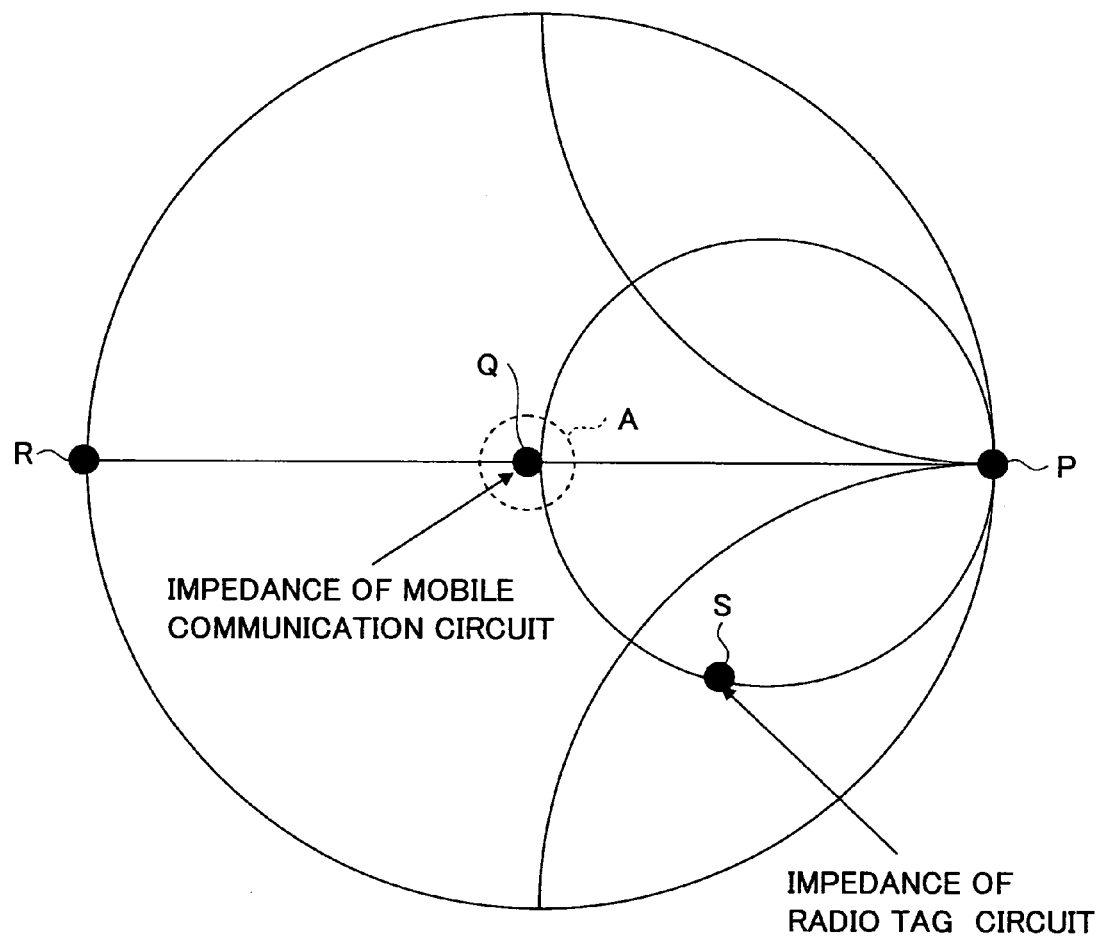
FIG. 1 is a Smith chart illustrating impedance characteristics of a mobile communication circuit or an antenna.
Figure 4:
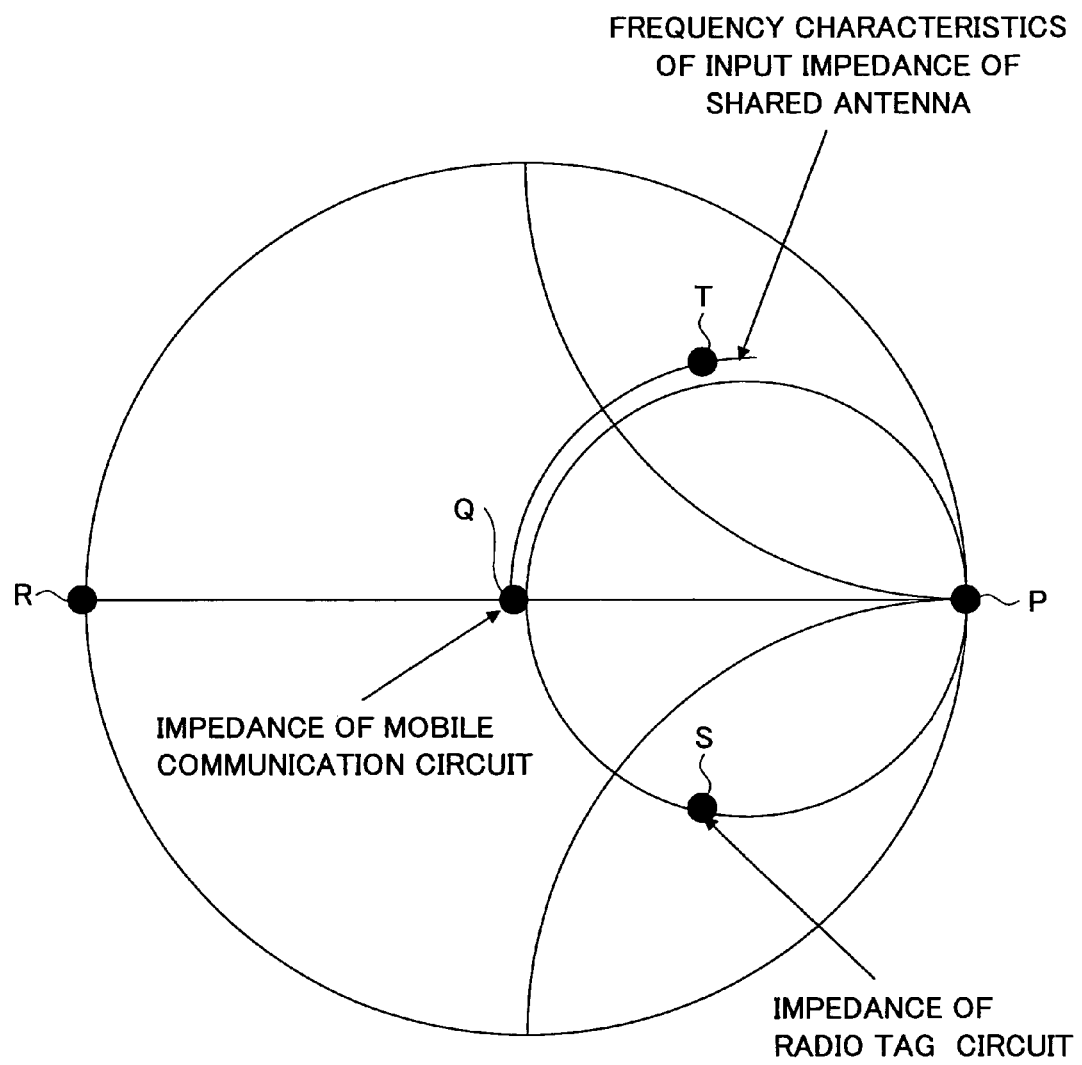
FIG. 4 shows a Smith chart illustrating impedance characteristics of the above circuits and the shared antenna.

FIG. 4 shows a Smith chart for illustrating impedance characteristics of the above circuits and the shared antenna. As explained above with reference to FIG. 1, the impedance of the mobile communication circuit 22 lies at a point Q which is near the matched impedance for its operation frequency (e.g. 800 MHz). The impedance of the radio tag 24 lies at a point S which is near the matched impedance for its operation frequency (e.g. 950 MHz). A point T represents impedance having the same resistance and the same but opposite sign reactance as the impedance represented by the point S.

The impedance at the point S is assumed to be (R−jX), so the impedance at the point T becomes (R+jX). The impedance of the shared antenna 28 employed in this embodiment is adjusted to be near the point Q for 800 MHz band, and near the point T for 950 MHz band. The impedance of the shared antenna 28 is matched with the mobile communication circuit 22 for the frequency band of the mobile communication, and matched with the radio tag chip 24 for the frequency band for the radio tag communication. The impedance of the shared antenna 28 is not matched with the radio tag chip 24 for the frequency band of the mobile communication, and is not matched with the mobile communication circuit 22 for the frequency band for the radio tag communication. Since the shared antenna 28 has such characteristics, it can be commonly used by both the mobile communication circuit 22 and the radio tag chip 24.

Figure 5A:
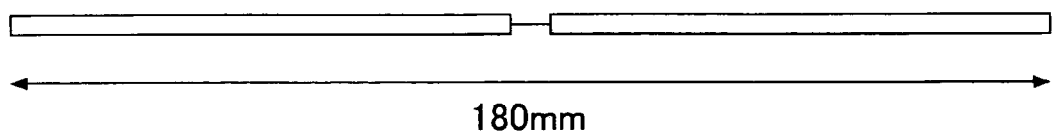
FIGS. 5A and 5B show a simulated example of the shared antenna.
Figure 5B:
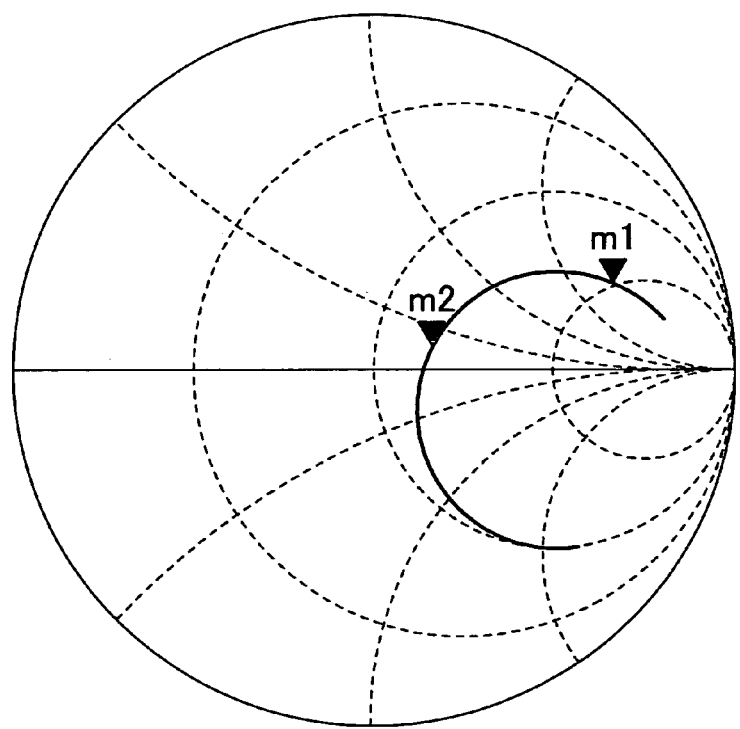

FIGS. 5A and 5B show a simulated example of such a shared antenna. In this simulation, a dipole antenna is used as shown in FIG. 5A. FIG. 5B is a Smith chart illustrating impedance characteristics of the dipole antenna shown in FIG. 5A. In this simulation, the length of the dipole antenna is 180 mm, and excited frequencies vary from 700 MHz to 1200 MHz, then its admittance is measured.

The input impedance of the dipole antenna is about 72 Ω (indicated by m2 in FIG. 5B) in the 820.6 MHz band, which is a mobile communication frequency band. Since mobile communication circuits in general are 50 Ω systems, it is considered that the circuits are practically well matched with the simulated dipole antenna. The admittance at the point m2 is 0.0120848-j0.0025434, the amplitude of refection coefficient s(1,1) is 0.258, and phase angle is 22.34 degrees. The absolute gain of the simulated dipole antenna is 2.17 dBi.

On the other hand, within the 953 MHz band, which is the operating frequency band of the radio tag chip, the resistance component of the simulated dipole antenna is about 320 Ω, and its inductance component is about 47 nH, which are indicated by m1 in FIG. 5B. The admittance at the point m1 is 0.0031236-j0.0035396, the amplitude of reflection coefficient s(1,1) is 0.737, and phase angle is 220.54 degrees. The absolute gain of the simulated dipole antenna is 2.33 dBi. It is assumed that a resistance component of an equivalent circuit of the radio tag chip is 340 Ω, and its capacitance component is 0.8 pF. The impedance condition for completely matching with this radio tag chip can be obtained by calculation in accordance with the matching condition shown in FIG. 3. A calculated resistance component is 340 Ω and a calculated inductance component is about 35 nH. These calculated values are not precisely equal to and different to some extent from the above values at the point m1, but are acceptably near the values at the point m1. The difference to that extent allows considering that the simulated dipole antenna is matched with the radio tag chip.

Generally, the effective gain p' of an antenna can be obtained by subtracting a loss amount L from an input power p and an absolute gain G. In this simulated dipole antenna, the loss amount L is small since the antenna is properly matched. Therefore a comparatively high effective gain is attained.

In accordance with this embodiment of the present invention, one antenna can be commonly used by a mobile communication circuit and a radio tag chip, whose operating frequencies and impedances are different from each other.

Figure 6A:
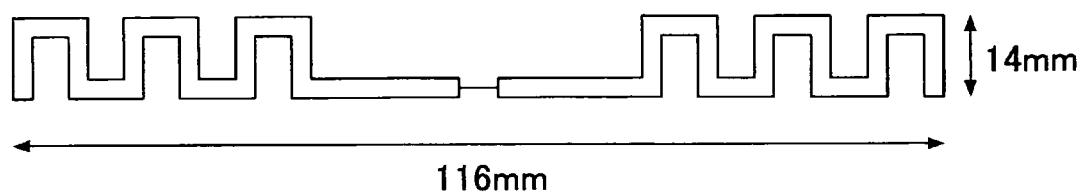
FIGS. 6A and 6B show a simulated second example of the shared antenna.
Figure 6B:
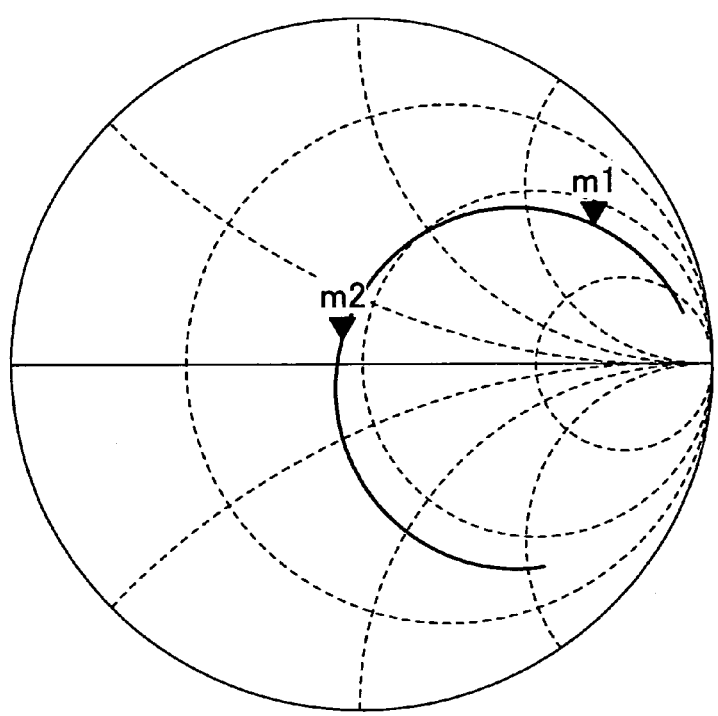

FIGS. 6A and 6B show simulation results of another shared antenna. In this example, the shared antenna has meandering lines or radiation elements. In this manner, the total length of the shared antenna can be reduced comparing with the linear dipole antenna shown in FIG. 5. The antenna's excited frequencies are varied from 700 MHz to 1200 MHz, and then its admittance is measured.

The input impedance of the meandering antenna is about 45 Ω (indicated by m2 in FIG. 6B) in the 820.6 MHz band which is a mobile communication frequency band. Since mobile communication circuits in general are 50 Ω systems, it is considered that the circuits are practically well matched with the simulated meandering antenna. The admittance at the point m2 is measured as 0.0230300-j0.0032974, the amplitude of refection coefficient s(1,1) is 0.104, and phase angle was 136.96 degrees. The absolute gain of the meandering antenna is 1.86 dBi.

On the other hand, within the 953 MHz band which is the operating frequency band of the radio tag chip, a resistance component of the simulated meandering antenna is about 364 Ω, and its inductance component is about 31 nH, which are indicated by m1 in FIG. 6B. The admittance at the point m1 is 0.0027466-j0.0053941, the amplitude of reflection coefficient s(1,1) is 0.773, and phase angle is 30.70 degrees. The absolute gain of the simulated meandering antenna is 1.94 dBi. In accordance with the above matching condition, it can be considered that the simulated meandering antenna is matched with the radio tag chip.

According to this embodiment of the present invention, by properly changing the size and shape of one antenna, it can be commonly used by a mobile communication circuit and a radio tag chip, whose operating frequencies and impedances are different from each other. Such antenna commonly used by a mobile communication circuit and a radio tag chip may have a variety of shapes different from FIGS. 5 and 6.

<Embodiment 2>

Figure 7:
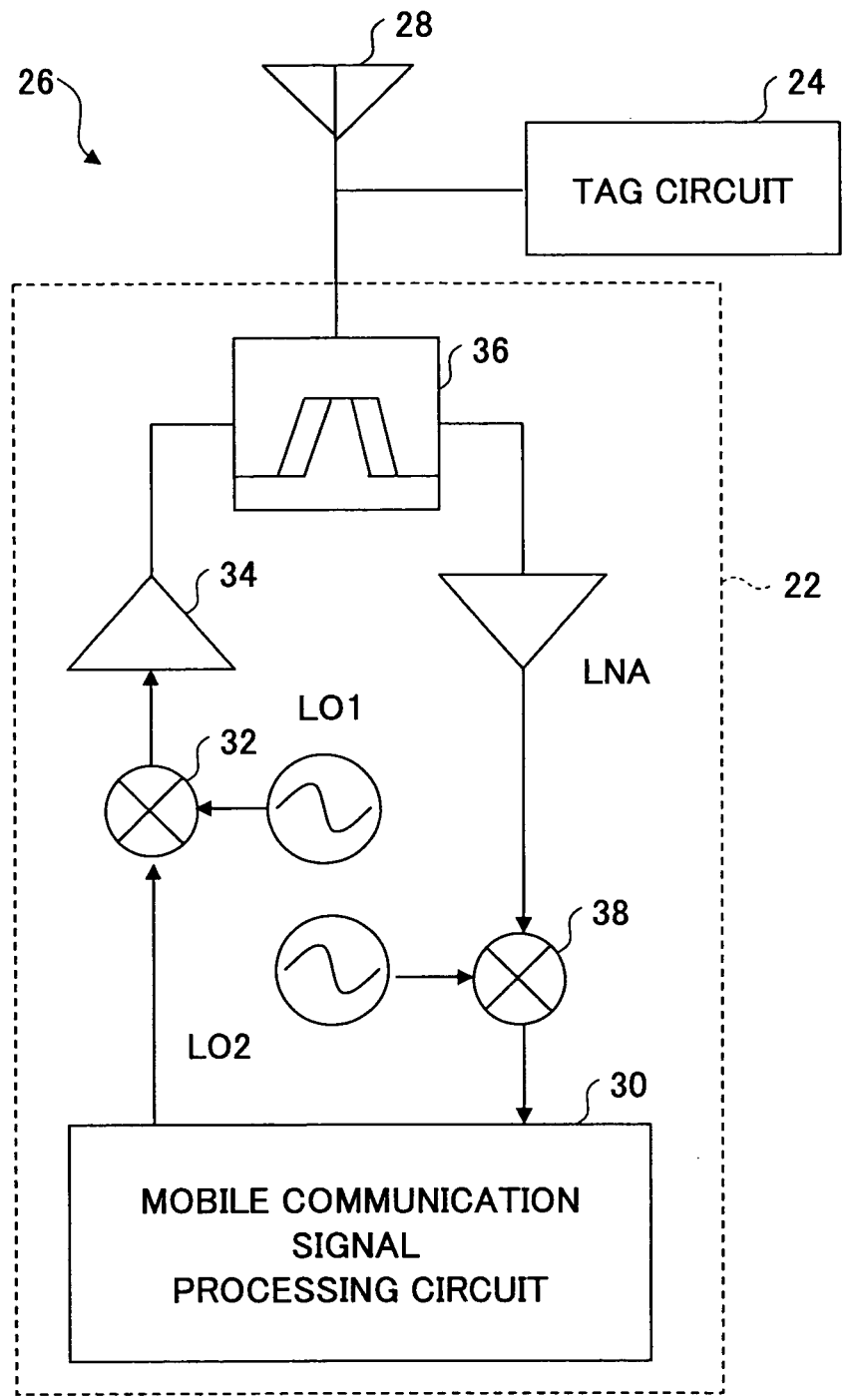
FIG. 7 shows a mobile communication terminal according to a second embodiment of the present invention.

FIG. 7 shows a mobile communication terminal according to a second embodiment of the present invention. The mobile communication terminal 26 has a shared antenna 28, a mobile communication circuit 22 and a tag circuit (radio tag chip) 24 connected to the antenna 28 in parallel. The shared antenna 28 has impedance characteristics as explained in the first embodiment. Base band signals or IF signals output from a mobile communication signal processing circuit 30 are up-converted to a transmission frequency band by a mixer 32 and a local oscillator LO1, amplified by a power amplifier 34, and transmitted from the shared antenna 28 via a duplexer 36. Signals received by the shared antenna 28 in the receiving frequency band of the mobile communication service are supplied to a receiving low noise amplifier LNA via the duplexer 36. The received signals are amplified by the receiving low noise amplifier LNA, down-converted to IF signals or base band signals by a mixer 38 and a local oscillator LO2, and demodulated in the mobile communication signal processing circuit 30. It is assumed that the frequency band of signals employed in the mobile communication service lies in the vicinity of 820 MHz.

The radio tag circuit 24 is connected to a node between the duplexer 36 and the antenna 28. The tag circuit 24 transmits and receives 953 MHz band signals. Since the shared antenna 28 has the impedance characteristics as explained in the first embodiment, the mobile communication circuit 22 and the tag circuit 24 can share the single antenna 28 and operate without interfering with each other. Accordingly, the mobile communication circuit 22 and the tag circuit 24 may operate simultaneously or at different times. If the mobile communication circuit 22 operates in the time divisional duplex (TDD) mode, but also in the frequency divisional duplex (FDD) mode as shown in FIG. 7, the duplexer 36 can be replaced with a switching between transmitting and receiving or a circulator.

In the example shown in FIG. 7, the tag circuit 24 is connected directly to the signal line of the mobile communication circuit. This is preferable from the viewpoint of applying the present invention to an existing mobile communication terminal. However, a matching circuit and the like can be inserted between the shared antenna 28 and the tag circuit 24 for further improving the impedance matching.

<Embodiment 3>

Figure 8:
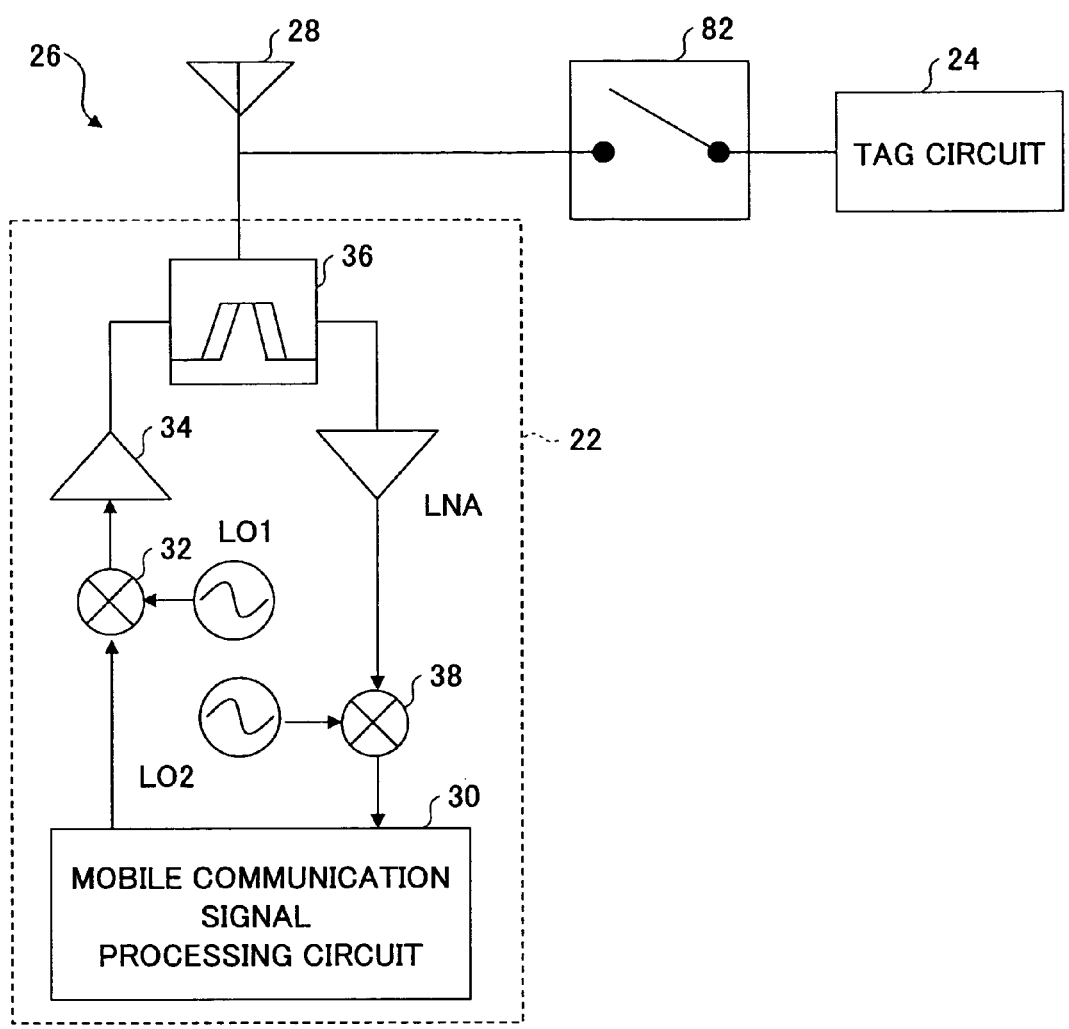
FIG. 8 shows a mobile communication terminal according to a third embodiment of the present invention.

FIG. 8 shows a third embodiment, in which a switch 82 is inserted between the shared antenna 28 and the tag circuit 24 in the mobile communication terminal of the second embodiment. The switch 82 has ON and OFF states and can selectively connect the tag circuit 28 to the antenna 28. The switch 82 may be formed by an SPST switch, for example. The switch 82 function can be realized by software or hardware within the housing, or can be realized by hardware outside of the housing. In this manner, the switch can allow the radio tag to selectively perform its function. For example, only when the user permits the use of the radio tag, the radio tag circuit 24 is turned ON to improve the safety and security of the use of the radio tag.

Some mobile communication terminals have plural antennas for utilizing plural mobile communication services. In that case, plural antennas can be commonly used by the mobile communication circuit 22 and the radio tag circuit 24. One or more shared antennas can be selectively connected to the tag circuit 24 by selecting means such as the switch 82.

<Embodiment 4>

Figure 9:
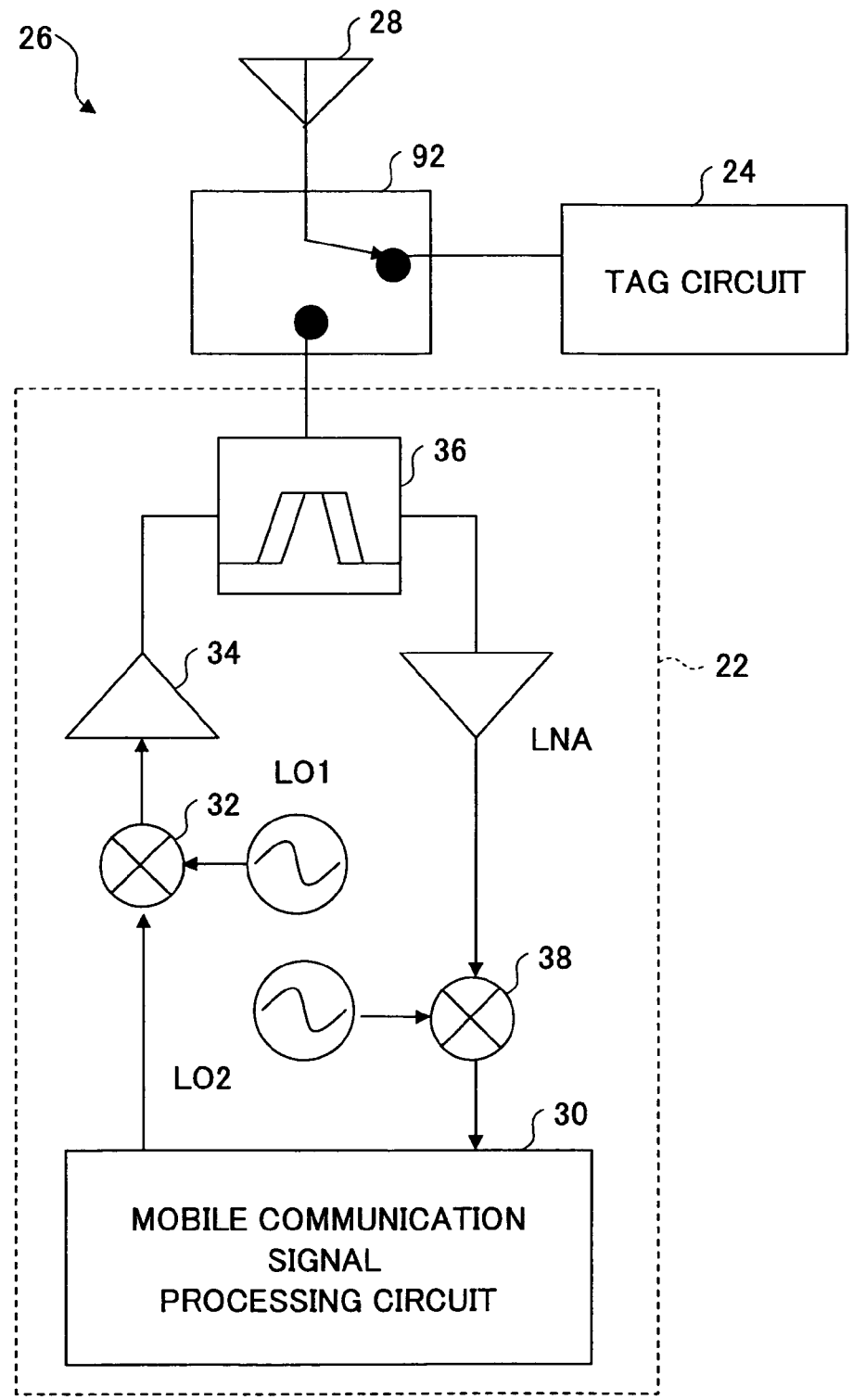
FIG. 9 shows a mobile communication terminal with a switch according to a fourth embodiment of the present invention.

FIG. 9 shows a mobile communication terminal according to a fourth embodiment of the present invention. The mobile communication terminal 26 has a shared antenna 28, a mobile communication circuit 22, a tag circuit (radio tag chip) 24, and a switch 92 which selectively connects the antenna 28 to one of the mobile communication circuit 22 and the tag circuit 24. The shared antenna 28 has impedance characteristics as explained in the first embodiment, similar to the mobile communication terminal shown in FIG. 7. Base band signals or IF signals output from a mobile communication signal processing circuit 30 are up-converted to a transmission frequency band by a mixer 32 and a local oscillator LO1, amplified by a power amplifier 34, and transmitted from the shared antenna 28 via a duplexer 36. Signals received by the shared antenna 28 in the receiving frequency band of the mobile communication service are supplied to a receiving low noise amplifier LNA via the switch 92 and the duplexer 36. The received signals are amplified by the receiving low noise amplifier LNA, down-converted to IF signals or base band signals by a mixer 38 and a local oscillator LO2, and demodulated in the mobile communication signal processing circuit 30.

The radio tag circuit 24 receives 953 MHz band signals via the switch 92. Since the shared antenna 28 has the impedance characteristics as explained in the first embodiment, the mobile communication circuit 22 and the tag circuit 24 can share the single antenna 28 and operate without interfering with each other. Since the switch 92 is provided in this embodiment, the mobile communication circuit 22 and the tag circuit 24 are not used simultaneously. In this manner, the mobile communication circuit 22 and the tag circuit 24 can be completely separated to improve the quality of signals.

Figure 10:
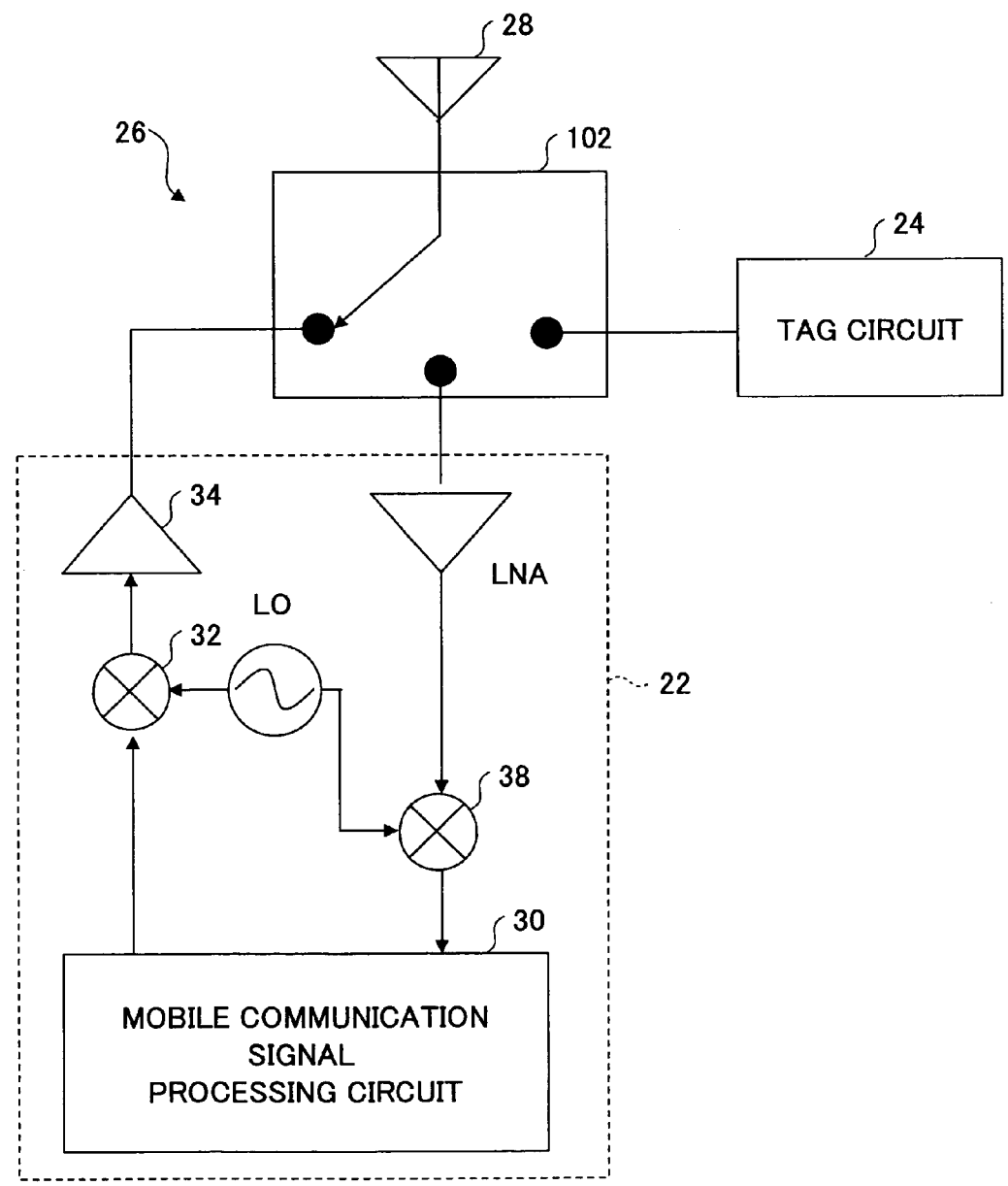
FIG. 10 shows a mobile communication terminal with another switch.

An SPDT switch is used as a switch in this embodiment, but an SP3T switch 102 can also be used as shown in FIG. 10, in which only one local oscillator LO is used.

<Embodiment 5>

Figure 11:
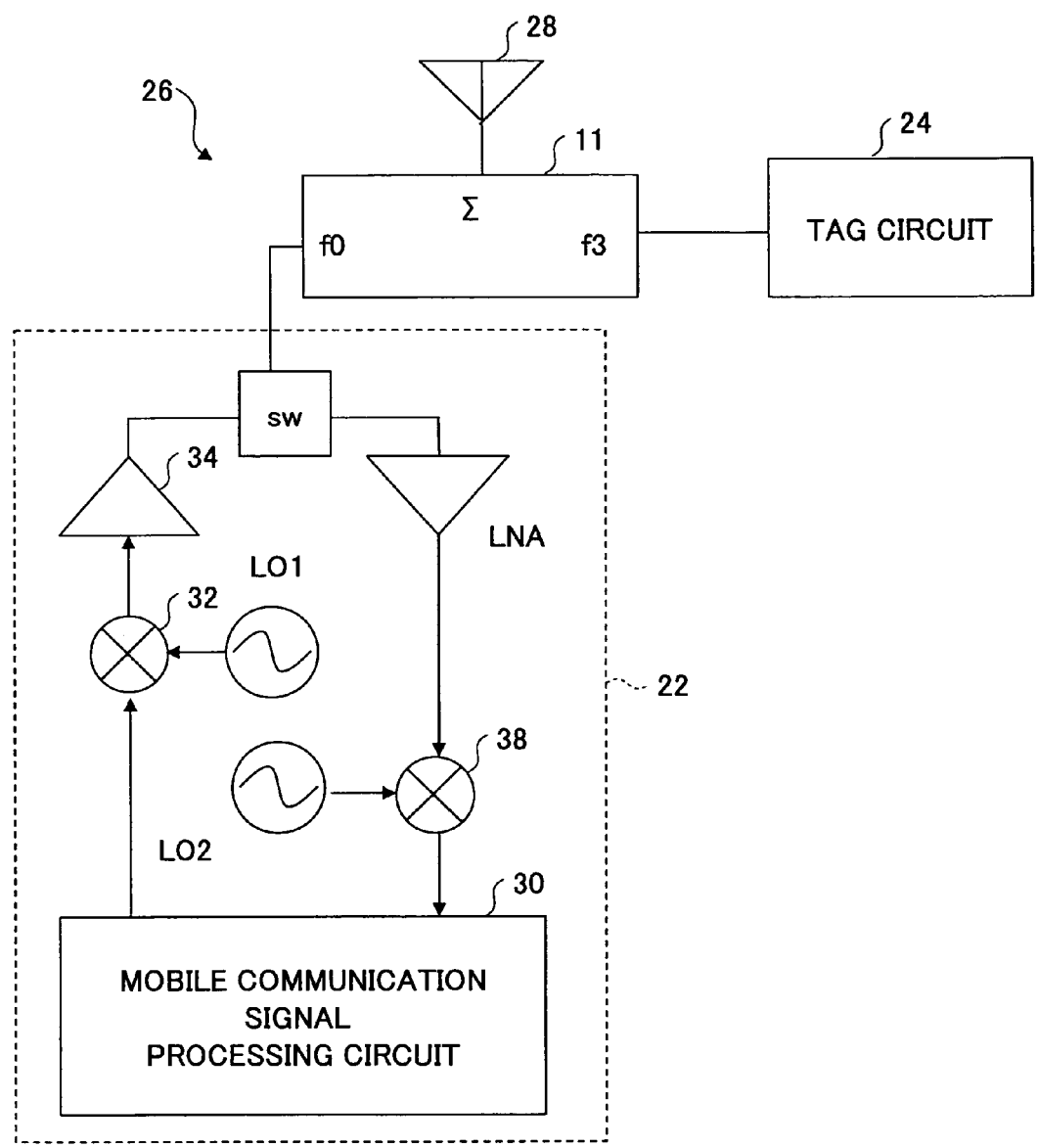
FIG. 11 shows a mobile communication terminal with a frequency discriminator according to a fifth embodiment of the present invention.

FIG. 11 shows a mobile communication terminal according to a fifth embodiment of the present invention. The mobile communication terminal 26 has a shared antenna 28, a mobile communication circuit 22, a tag circuit (radio tag chip) 24 and a frequency discriminator 11. Similar to the mobile terminal shown in FIG. 7, the shared antenna 28 has impedance characteristics as explained in the first embodiment. In this embodiment, signals for the mobile communication and signals for the radio tag are discriminated by the frequency discriminator 11 and connected to the shared antenna 28. In this example shown in FIG. 11, the frequency discriminator 11 has a transmitting and receiving port f0 for the mobile communication and a port f3 for the radio tag. In this manner, the mobile communication circuit and the tag circuit can be separated by frequencies, to reduce interference with each other.

The frequency discriminator in this embodiment has two frequency ports, but may have three frequency ports (f1, f2, f3) as shown in FIG. 12.

The present invention is explained with reference to several embodiments separately, but those embodiments can be combined with each other within the scope of the present invention.

Further, the present invention is not limited to these embodiments and their combinations, but variations and modifications may be made without departing from the scope of the present invention.

The present application is based on Japanese Priority Application No. 2006-075006 filed on Mar. 17, 2006 with the Japanese Patent Office, the entire contents of which are hereby incorporated by reference.

What is claimed is:

1. A mobile communication terminal used in a mobile communication system providing mobile communicating service in a first frequency band, comprising:
    a first signal processing circuit, having a first impedance, configured to process signals for the mobile communication service;
    a second signal processing circuit, having a second impedance different from the first impedance, configured to process signals for radio tag communicating in a second frequency band;
    an antenna configured to be commonly used by the first and second signal processing circuits, wherein the signals for the mobile communication service and the signals for the radio are mutually independent; and
    a frequency discriminator coupled between the first and second signal processing circuits and coupled to the antenna and configured to discriminate the signals for the mobile communication and the signals for the radio tag, the frequency discriminator having a transmitting and receiving port for the mobile communication and a port for the radio tag, so that the first signal processing circuit and the second signal processing circuit are separable by frequencies in order to reduce interference therebetween;
    wherein an impedance of the antenna is matched to the first impedance of the first signal processing circuit in the first frequency band and matched to the second impedance of the second signal processing circuit in the second frequency band by adjusting at least one of a material, a shape and a size of the antenna.

2. The mobile communication terminal as claimed in claim 1, wherein the impedance of the antenna is mismatched with the second impedance of the second signal processing circuit in the first frequency band and mismatched with the first impedance of the first signal processing circuit in the second frequency band.

3. The mobile communication terminal as claimed in claim 1, wherein the antenna comprises a dipole antenna.

4. The mobile communication terminal as claimed in claim 1, wherein the antenna has meandering lines.

5. The mobile communication terminal as claimed in claim 1, wherein the second frequency band includes at least part of an UHF (Ultra High Frequency) band.

6. The mobile communication terminal as claimed in claim 1, wherein the first and second signal processing circuits are coupled to the antenna in parallel.

7. The mobile communication terminal as claimed in claim 6, further comprising:
a switch configured to selectively couple the antenna to the second signal processing circuit.

8. The mobile communication terminal as claimed in claim 1, further comprising:
a switch configured to selectively couple the antenna to one of the first and second signal processing circuits.

9. The mobile communication terminal as claimed in claim 8, wherein the switch selectively couples the antenna to one of a transmitting portion of the first signal processing circuit, a receiving portion of the first signal processing circuit and the second signal processing circuit.

10. The mobile communication terminal as claimed in claim 1, wherein the frequency discriminator discriminates frequencies used in the transmitting portion of the first signal processing circuit, the receiving portion of the first signal processing circuit and the second signal processing circuit.

11. The mobile communication terminal as claimed in claim 1, wherein the mobile communication terminal is formed by a mobile phone terminal.

12. A mobile communication terminal used in a mobile communication system providing mobile communicating service in a first frequency band, comprising:
a first signal processing circuit, having a first impedance, configured to process signals for the mobile communication service;
a second signal processing circuit, having a second impedance different from the first impedance, configured to process signals for radio tag communicating in a second frequency band;
an antenna configured to be commonly used by the first and second signal processing circuits; and
a switch configured to selectively couple the antenna to one of the first and second signal processing circuits;
wherein the signals for the mobile communication service and the signals for the radio are mutually independent; and
a frequency discriminator coupled between the first and second signal processing circuits and coupled to the antenna and configured to discriminate the signals for the mobile communication and the signals for the radio tag, the frequency discriminator having a transmitting and receiving port for the mobile communication and a port for the radio tag, so that the first signal processing circuit and the second signal processing circuit are separable by frequencies in order to reduce interference therebetween;
wherein an impedance of the antenna is matched to the first impedance of the first signal processing circuit in the first frequency band and matched to the second impedance of the second signal processing circuit in the second frequency band, and
the switch selectively couples the antenna at one time to one of a transmitting portion of the first signal processing circuit, a receiving portion of the first signal processing circuit, and the second signal processing circuit.

13. A mobile communication terminal used in a mobile communication system providing mobile communicating service in a first frequency band, comprising:
a first signal processing circuit, having a first impedance, configured to process signals for the mobile communication service;
a second signal processing circuit, having a second impedance different from the first impedance, configured to process signals for radio tag communicating in a second frequency band;
an antenna configured to be commonly used by the first and second signal processing circuits; and
a frequency discriminator coupled between the first and second signal processing circuits and coupled to the antenna and configured to discriminate the signals for the mobile communication and the signals for the radio tag, the frequency discriminator having a transmitting and receiving port for the mobile communication and a port for the radio tag, so that the first signal processing circuit and the second signal processing circuit are separable by frequencies in order to reduce interference therebetween,
wherein the signals for the mobile communication service and the signals for the radio are mutually independent, and
wherein an impedance of the antenna is matched to the first impedance of the first signal processing circuit in the first frequency band and matched to the second impedance of the second signal processing circuit in the second frequency band, and
the frequency discriminator discriminates frequencies used in the transmitting portion of the first signal processing circuit, the receiving portion of the first signal processing circuit, and the second signal processing circuit.

* * * * *